United States Patent [19]

Deutschmann, Sr.

[11] Patent Number: 5,107,621
[45] Date of Patent: Apr. 28, 1992

[54] HYDROCULTURE GROWING SYSTEM WITH IMPROVED LIGHT/WATER METER

[76] Inventor: Gary V. Deutschmann, Sr., 12341 Promenade La., Creve Coeur, Mo. 63146-5057

[21] Appl. No.: 406,161

[22] Filed: Sep. 12, 1989

[51] Int. Cl.$^5$ .............................................. A01G 25/00
[52] U.S. Cl. .............................................. 47/79; 47/59
[58] Field of Search ................... 47/71, 75, 79–81, 47/66

[56] References Cited

U.S. PATENT DOCUMENTS

| | | |
|---|---|---|
| 124,207 | 5/1872 | Hess .............................. 47/79 |
| 195,580 | 9/1877 | Crater ........................... 47/80 |
| D. 257,529 | 11/1980 | Rapp . |
| 2,406,439 | 8/1946 | Pratt . |
| 2,799,089 | 7/1957 | Banker . |
| 3,137,096 | 6/1964 | Hopkins . |
| 3,483,656 | 12/1969 | Baumann . |
| 3,534,498 | 9/1969 | Herrli . |
| 3,535,933 | 2/1969 | Pliml . |
| 3,739,524 | 6/1973 | Rose . |
| 3,896,587 | 7/1975 | Insalaco . |
| 4,001,967 | 1/1977 | Swift . |
| 4,055,991 | 11/1977 | Bridwell . |
| 4,067,716 | 1/1978 | Sterrett ......................... 71/25 |
| 4,081,265 | 3/1978 | Pluenneke . |
| 4,083,146 | 4/1978 | Brankovic . |
| 4,100,699 | 7/1978 | Skaife . |
| 4,106,235 | 8/1978 | Smith . |
| 4,143,487 | 3/1979 | Hollwarth . |
| 4,160,342 | 7/1979 | Dryer . |
| 4,171,593 | 10/1979 | Bigglestone . |
| 4,173,097 | 11/1979 | Staby . |
| 4,216,623 | 8/1980 | Silver . |
| 4,270,309 | 6/1981 | Baumann . |
| 4,344,251 | 8/1982 | Edling . |
| 4,356,665 | 11/1982 | De Oliveira . |
| 4,557,070 | 12/1985 | Oyama . |
| 4,663,884 | 5/1987 | Zeischegg . |
| 4,900,348 | 2/1990 | Hoitink ......................... 71/6 |
| 4,929,049 | 5/1990 | Goallon ..................... 350/96.29 |

FOREIGN PATENT DOCUMENTS

| | | | |
|---|---|---|---|
| 3338129 | 5/1985 | Fed. Rep. of Germany | 47/79 |
| 1470367 | 1/1967 | France | 47/79 |
| 2544958 | 11/1984 | France | 47/75 |
| 7414433 | 5/1975 | Netherlands | 47/79 |
| 2018115 | 10/1979 | United Kingdom | 47/71 |

OTHER PUBLICATIONS

Dictionary Definitions From "The Condensed Chemical Dictionary" 5th edition © Reinhold 1956.

*Primary Examiner*—Henry E. Raduazo
*Attorney, Agent, or Firm*—Polster, Polster and Lucchesi

[57] ABSTRACT

A hydroponic planter includes an outer container and an inner liner. The liner includes a central inverted cup-shaped reservoir for a liquid nutrient solution. The outer wall of the liner includes slots extending substantially above the height of the reservoir, to provide aeration of the roots of plants growing in the planter. A combined light and liquid level indicator determines the minimum amount of light in which the planter can be placed, shows when to add nutrient solution to the planter, and indicates when too little, sufficient or too much nutrient solution has been added. The light/liquid level monitor includes three light-transmitting rods of different lengths extending between the outer container and the liner; one extends to the bottom of the liner, another to below the top of the reservoir, and the third to near the top of the reservoir. The rods have flat upper indicating surfaces and conical ends so that the indicating surface becomes dark in appearance when the conical end is immersed in liquid.

11 Claims, 4 Drawing Sheets

HYDROCULTURE GROWING SYSTEM WITH IMPROVED LIGHT/WATER METER

BACKGROUND OF THE INVENTION

This invention relates to hydroponic planters. It is particularly concerned with such a planter which facilitates giving plants growing in the planter proper light, water, nutrients, and aeration.

Growing plants in a planter has long required considerable care and skill. Too often, house plants receive too little or too much care, and they succumb. Many attempts have been made to simplify the care of houseplants, but none has been simple enough or effective enough to provide a widely acceptable system.

Hydroponic plant systems have certain advantages over soil-based systems, but even they have not proven adequate to the simple growing of houseplants over long periods of time.

When growing plants in a hydroponic setting, it is very important to have the plant growing in an area where it is not too dark and to have the level of the liquid nutrients in the planter not exceed a maximum level, nor should the plants be dry for too long. If overwatering occurs, the plant will die from root rot. Allowing the roots of the plant to be dry for too long results in dehydration and starving the plant. Thus, an accurate method of determining liquid levels in the planter is necessary.

The plant industry currently uses hand-held, electronically operated gauges to determine appropriate light levels for a given plant. These gauges are expensive and cumbersome.

Light gauges have sometimes been associated with or combined with a bimetallic operated moisture indicator, but these indicators are useless in any form of hydroponics. Generally, the water/nutrient level indicators used in the field of hydroponics have been the dipstick and float types as exemplified by U.S. Pat. No. 2,799,089 Banker, U.S. Pat. No. 3,483,656 Baumann, U.S. Pat. No. 3,739,524 Rose, U.S. Pat. No. 4,055,991 Bridwell, U.S. Pat. No. 4,171,593 Bigglestone, U.S. Pat. No. 4,270,309 Baumann and U.S. Pat. No. Des. 257,529 Raap. Their disadvantages become apparent during use: the float is easily clogged by salt buildup, root fines, or live roots growing into the slots in the meter, and gives false readings which result in the death of the plants. In addition, the float and the rod displace a certain amount of liquid, so even when the meter reads empty, there can be over one-half inch of water/nutrient remaining in the system. Because plant roots require a periodic drying for their health, these meters lead to frequent overwatering of the plant and death of the plants. Windows in the sides of the pot have also been tried. However, algae buildup on the windows makes them unreadable in short order, and the windows tend to leak after some handling.

Many systems have been developed over the years to help alleviate the problems with over- and underwatering, diseases, pests and human error. To help eliminate water spills, the plant saucer was developed and soon began to be used as a watering device, which brought on the development of simple self-watering devices and even more controlled self-waterers utilizing wicks or capillary action through porous materials as exemplified by such patents as U.S. Pat. Nos. 2,406,439 Pratt, U.S. Pat. No. 3,137,096 Hopkins, U.S. Pat. No. 3,739,524 Rose, U.S. Pat. No. 4,001,967 Swift, U.S. Pat. No. 4,083,146 Brankovic, U.S. Pat. No. 4,106,235 Smith, U.S. Pat. No. 4,143,487 Hollwarth, U.S. Pat. No. 4,160,342 Dryer, U.S. Pat. No. 4,216,623 Silver, U.S. Pat. No. 4,344,251 Edling, U.S. Pat. No. 4,356,665 De Oliveira, and U.S. Pat. No. 4,557,070 Oyama. Most of these devices did not alleviate the problems of over- and underwatering.

Overwatering and drainage have been such a large problem that numerous patents have been issued on simple pots with improved drainage or more complex collapsible pots with aeration features such as depicted in U.S. Pat. No. 4,100,699 Skaife and U.S. Pat. No. 4,173,097 Staby.

With hydroponics and the advent of true hydroculture techniques reaching the public, many attempts to use hydroculture techniques with soil plants have been made, as shown by U.S. Pat. No. 3,534,498 Herrli, which is now considered a capillary wick waterer. Hydroculture in its present form has been around for quite some time with little change in the growing medium, the aeration methods, or the way in which liquid levels are determined, as suggested by U.S. Pat. No. 3,483,656 Baumann, U.S. Pat. No. 4,270,309 Baumann, and U.S. Pat. No. 4,663,884 Zeischegg. As exemplified by these patents, such hydroponic systems have frequently used an open-topped outer container for holding liquid, an open-topped inner container for holding an inert growing medium, and a plant in the medium. The inner container includes openings at its lower end to allow liquid to enter the growing medium and to drain from it.

The growing medium used in hydroponic systems has always been what was readily available locally or could be obtained in large quantities, cheaply. In many cases perlite or vermiculite has been tried for hydroculture but the norm is expanded clay pellets, most of which are imported from European countries. Imported expanded clay, although claimed to be the perfect medium, does slake in water and eventually breaks down to chalk, much like the decay of used brick. The liquid retention properties of clay pellets are acceptable, but their various manufactured shapes have led to many problems. The round substrate although non-damaging to roots never lends good anchorage to the root ball, and as the plant's roots grow and expand, capillary action of this substrate begins to decay. The peanut shaped substrate gives better anchorage to the roots but slakes rapidly, clogging root hairs and killing the plant. Slight compaction and sharp edges tend to cut or smother the plant's roots. Expanded shale, commonly called Haydite, contains chemicals which slake into the water, poisoning the system and eventually killing the plant. Sodium and sulfur are the most notable of these chemicals.

SUMMARY OF THE INVENTION

One of the objects of this invention is to provide a convenient, efficient and disease-free device for raising plants, such as nursery stock, foliage plants, and the like.

Another object of this invention is to provide such a device which includes a simple, inexpensive, and accurate gauge for determining whether a plant has sufficient light, when to water and feed the plant, and how much water and nutrient solution to give.

Another object of the present invention is to provide a light and liquid level indicator which may be produced easily and inexpensively.

Another object of this invention is to provide such a growing device which provides a better growing medium than previously known devices.

Another object of this invention is to provide such a growing device which permits infrequent watering of its plants.

Another object of this invention is to provide such a growing device which develops healthy root systems, free of root rot.

Another object is to provide such a growing device having both an inner pot and outer pot which can be nested with other inner and outer pots for easy storage and transport.

Other objects of this invention will be apparent to those skilled in the art in light of the following description and accompanying drawings.

In accordance with one aspect of this invention, generally stated, a planter is provided comprising an outer container, a perforated liner and a novel growing medium in the liner, comprising pellets of horticulturally stable expanded slate. The growing medium does not decompose, rot or slake in water. When fired, the slate expands vertically forming wafer-like layers with edge separation. The pellets provide a much greater surface area to size ratio than previous media. They thus provide better liquid retention, lend excellent anchorage for the root structure, and provide freer uptake and release of both a water/nutrient mixture and oxygen.

In accordance with another aspect of this invention, generally stated, a planter is provided comprising an outer container, a perforated liner and an inert growing medium. The liner includes a raised central reservoir, in the form of an inverted cup. Air passages are provided in the outer wall of the liner from below the top of the reservoir to a height substantially above the height of the reservoir, preferably to a height substantially more than half way to the top of the liner, most preferably to within twenty-five percent of the top of the liner. The air passages are preferably slots. The size and number of the slots are chosen in such a way as to provide adequate air interchange with the roots of the plant growing in the medium, while maintaining a continuum of humidity from nearly 100% above the reservoir to room humidity (nominally 55%) one inch below the top of the medium. This zone of controlled, continuously-varying humidity permits the plant to extend its roots to a level of comfort for that plant. Therefore, plants requiring widely different amounts of water may be grown in the same container. The dry upper surface of the growing medium eliminates bacterial growth and moss from the surface of the growing medium. It also greatly reduces the risk of insect infestation and disease and reduces the risk of germination of foreign seeds on the surface.

In accordance with another aspect of this invention, generally stated, a planter is provided comprising an outer container, a perforated liner, growing medium, and a light/liquid level meter positioned therebetween. The indicator includes a plurality of light-transmitting rods, each having an upper indicating surface and a retroreflective bottom, so that the indicating surface of the rod appears dark when immersed in liquid and light when out of liquid. Preferably, the liner includes an inward step in its rim, over a recess in its side wall, for receiving the rods, so that the rods extend between the outer container and the liner, but appear to extend into the growing medium.

The minimum lighting conditions are determined by filling the planter with liquid so that only the longest rod is immersed. The planter is then moved until a location is found where the longest rod turns dark and the rest stay light in appearance. Because the ability of the rod to work (to change from light to dark and back again) is directly proportional to the diameter of the rod, rods of varying diameters may be used for various types of plants. A plant requiring less light will use wider rods, and one requiring more light will use narrower rods.

Determining when to add water/nutrient solution and the amount of liquid necessary similarly depends on the change in appearance of the indicating surfaces. No water/nutrient solution is added until the longest rod becomes light. That does not occur until the bottom of the liner has been out of the liquid for about a week, because it sits about one-quarter inch above the bottom of the outer pot. During that week, the growing medium becomes about ten to twenty percent drier, without losing all of its moisture. The plants growing in the planter therefore extend their roots somewhat deeper, and their main feeding roots (tap roots) are permitted to reach deeper into the reservoir area. This drying process therefore both strengthens the plant and prevents root rot. The planter is then filled with water/nutrient solution until the middle rod changes from light to dark but before the shortest rod becomes dark. If the shortest rod becomes immersed, it is necessary to empty some of the water/nutrient solution from the planter to prevent overwatering, and to maintain the controlled range of humidity from the top to bottom of the planter.

Other aspects of the invention will best be understood in light of the following description of the preferred embodiment of the invention.

DESCRIPTION OF THE PREFERRED EMBODIMENT

Figure 1:
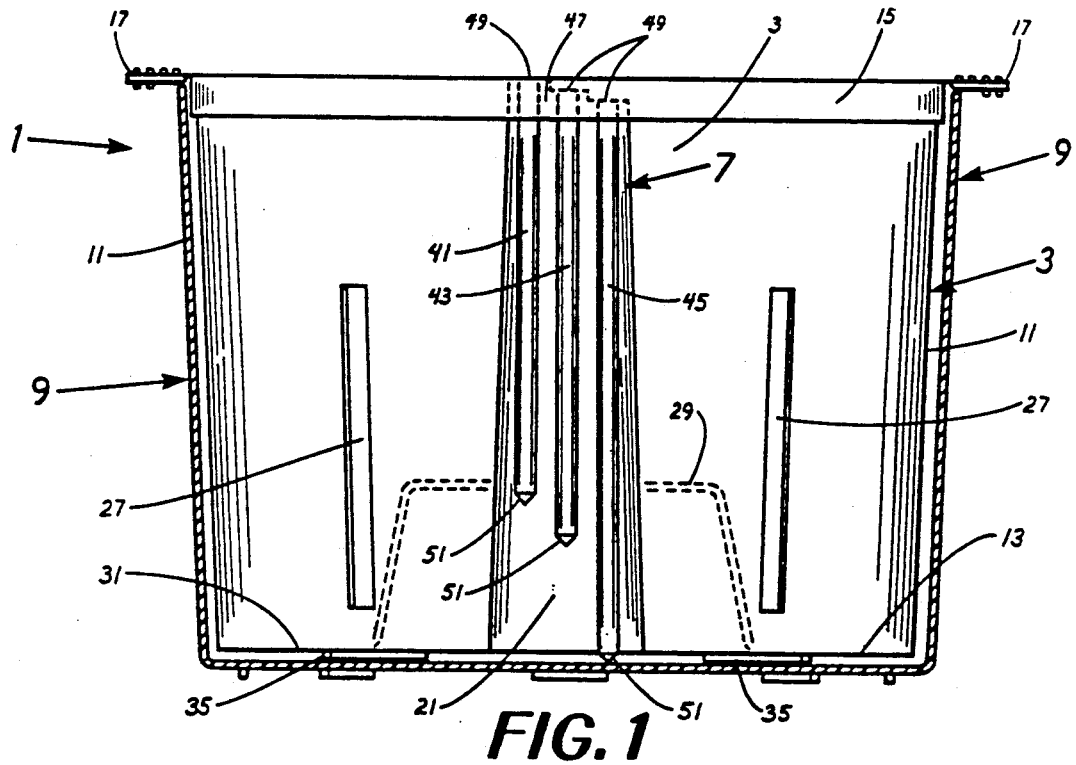
FIG. 1 is a view in front elevation of a planter of the present invention, with an outer pot portion cut away.
Figure 2:
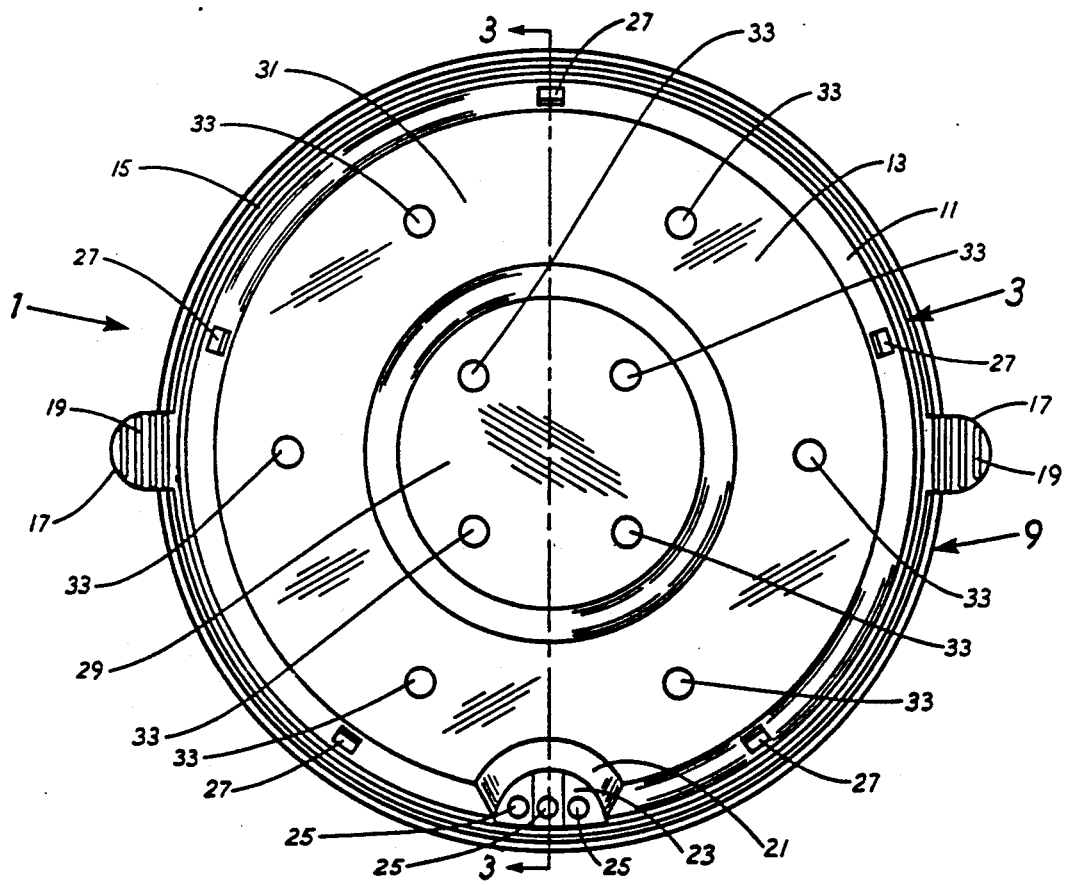
FIG. 2 is a top plan view of the planter of FIG. 1, not filled with growing medium or a plant, so as to show the construction of the liner.
Figure 3:
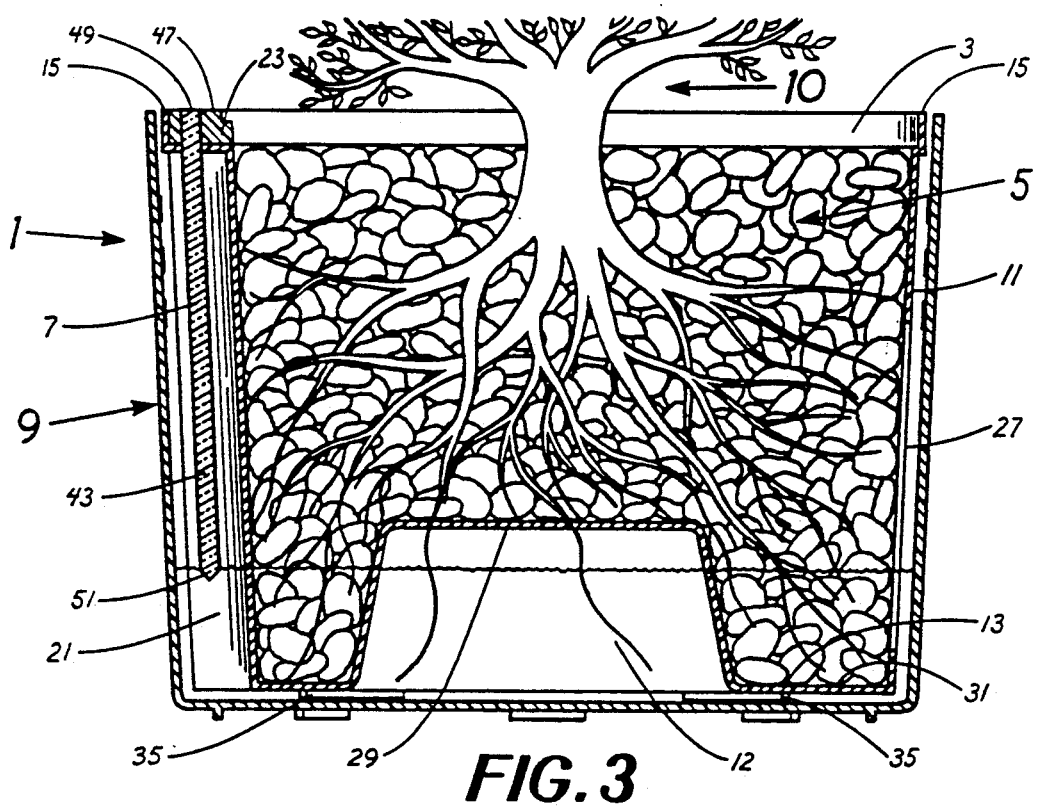
FIG. 3 is a sectional view taken along the line 3—3 of FIG. 2, with growing medium plants, and water/nutrient in the planter.
Figure 4:
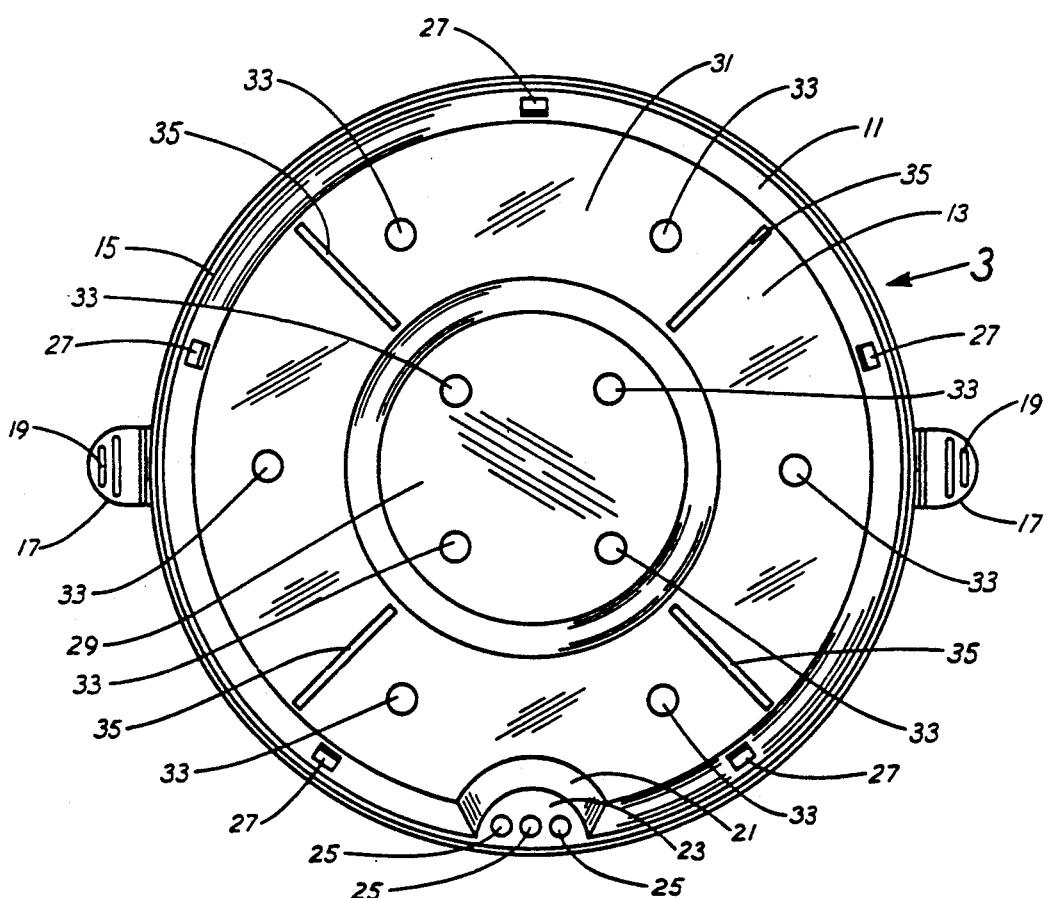
FIG. 4 is a bottom plan view of the liner portion of the planter of FIGS. 1-3.
Figure 5:
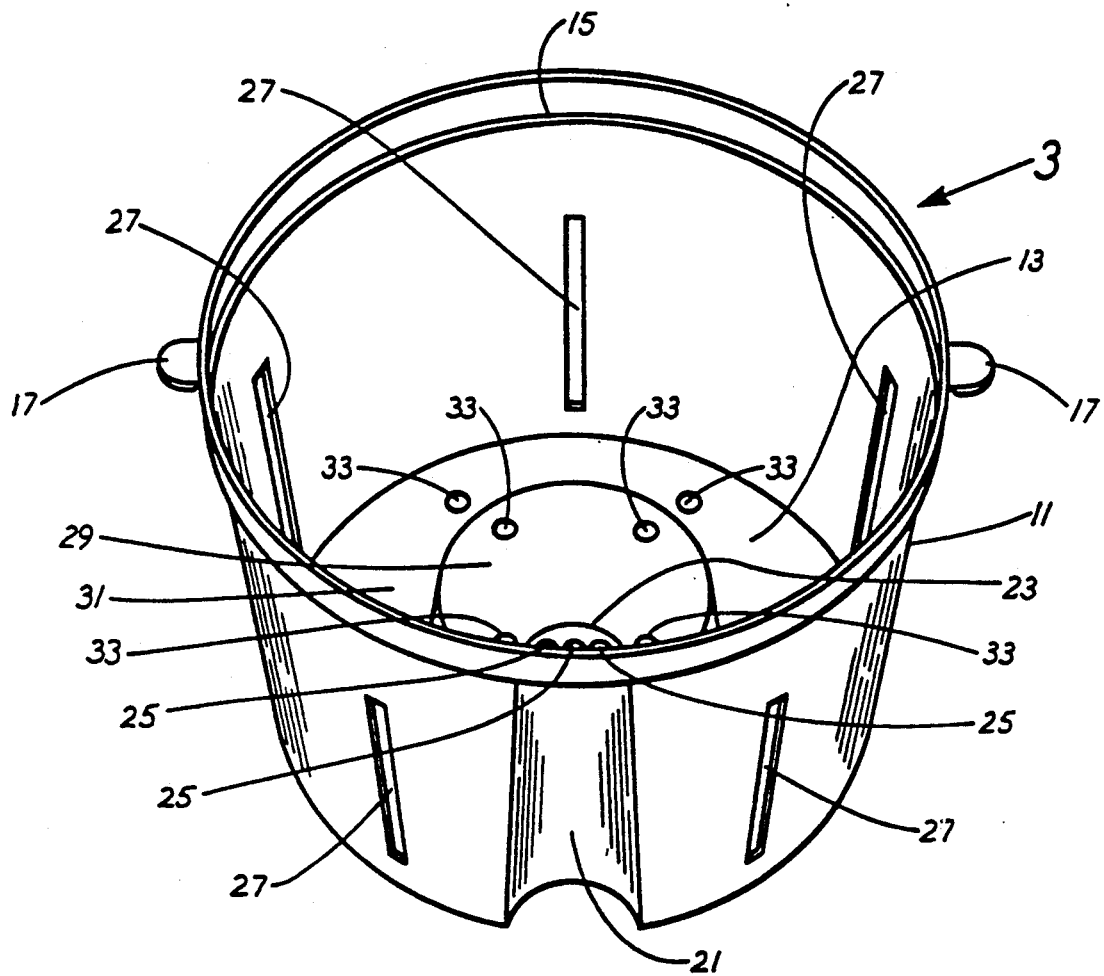
FIG. 5 is a view in perspective of the liner of FIG. 4.
Figure 6:
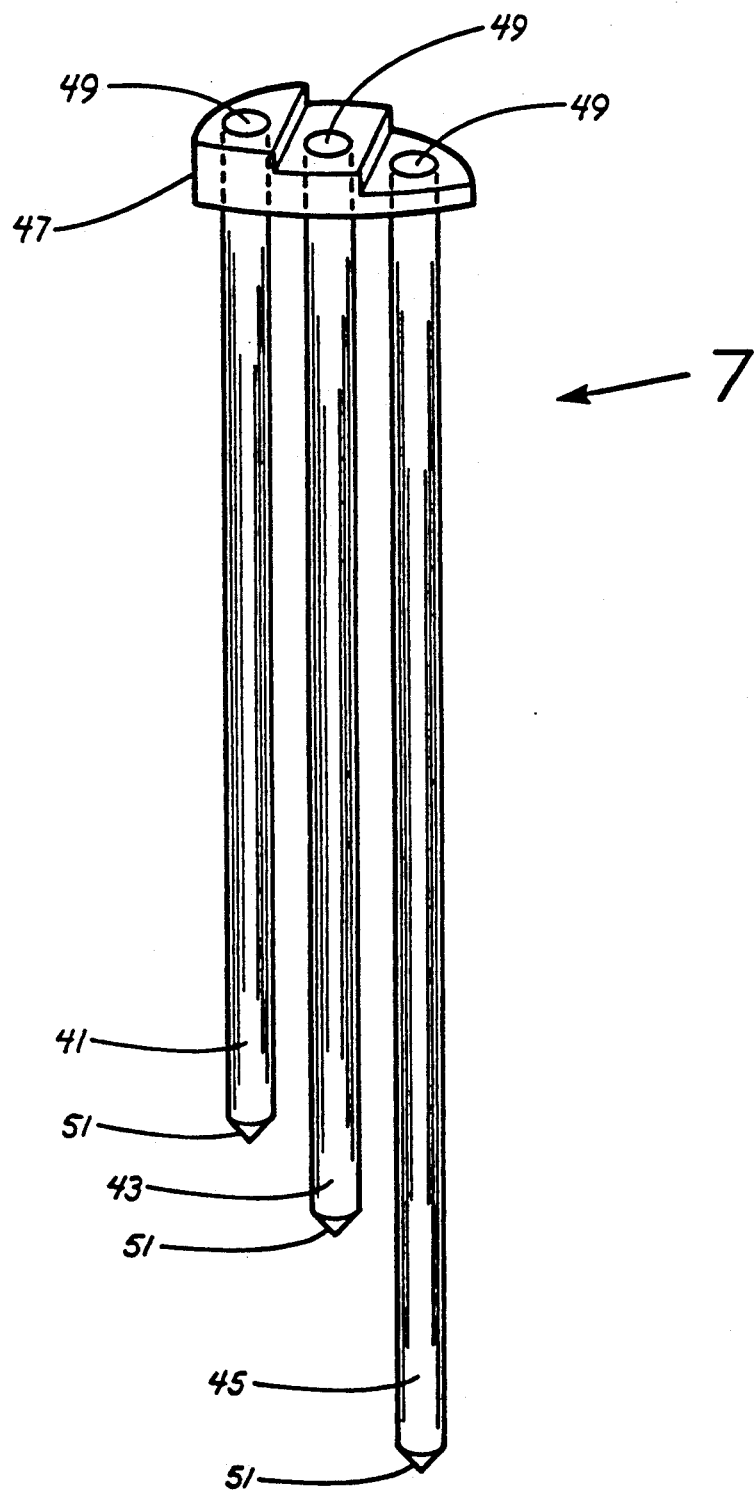
FIG. 6 is a view in perspective of a light/liquid level meter portion of the planter of FIGS. 1-3.

Referring now to the drawings, reference numeral 1 indicates one illustrative embodiment of hydroculture planter of the present invention. The planter 1 includes a slightly frustoconical liner 3 filled with growing medium 5, a light/liquid meter 7, and an outer pot 9.

A plant 10 in the planter is fed and watered entirely with an aqueous solution of nutrients 12, in accordance with known hydroculture techniques. The nutrient is preferably a complete nutrient solution that contains no detrimental chemicals, while providing all known elements required for proper plant growth in a form readily useable by the plant.

The liner 3 is made of horticulturally neutral, opaque, one-sixteenth inch polyethylene. It has a sloping side wall 11 and a bottom 13 The liner 3 is approximately seven inches high, nine and one-half inches in diameter at its top and eight and three-quarters inches in diameter at its bottom.

At its upper, open, edge, the liner 3 includes an offset rim 15 for stiffening the liner. Tabs 17 are provided at the top of the rim 15 for lifting the liner 3 from the outer pot 9. Each tab 17 has raised ridges 19 on its upper and lower surfaces, to provide the user with a firm grip on the tabs even when the tabs or the user's hands are wet.

The side wall 11 of the liner 3 includes an arcuate indentation 21 extending from the rim 15 to the bottom 13 of the liner 3 and flaring somewhat toward the bottom. At its upper end, the indentation 21 has a horizontal closure wall 23 with three holes 25 in it, for holding the light/liquid meter 7 as described hereinafter. The closure wall 23 is inside the rim 15 and gives the impression, when the liner is filled with growing medium 5, that the meter 7 extends into the growing medium.

Side wall 11 also includes five aeration slots 27. Each aeration slot 27 is four inches long and five-sixteenths inches wide. The slots begin one-half inch from the bottom wall 13 of the liner 3. The size and position of the slots are carefully chosen, as described hereinafter.

A raised center portion 29 of bottom wall 13 is approximately two inches high and five inches in diameter. Both the raised center portion 29 and the lower surrounding portion 31 of the bottom wall 13 have drainage holes 33. The size and number of the drainage holes are not critical to the operation of the system. Raised center portion 29 forms a reservoir of liquid so that more liquid may be stored in the system without being displaced by the growing medium 5. It also defines a platform above the level of liquid in the system for purposes described hereinafter.

Radial feet 35 on the bottom wall 13 raise the bottom wall three-sixteenths inch above the outer container 9. The growing medium 5 is therefore held one-quarter inch above the bottom of the outer container 9, for purposes described hereinafter.

The growing medium 5 is expanded slate in the form of oblong pellets having a length of from about ten to twenty millimeters. The slate is expanded in a rolling kiln, to eliminate sharp edges which might cut delicate rootlets. It has been found that horticulturally stable slate is widely available, which does not decompose, rot, or slake in water. Slate when fired expands vertically, similar to mica, forming wafer-like layers. These layers with their edge separation provide a much greater surface-area-to-size ratio than any product previously tried. This greater area allows for much better liquid retention and lends excellent anchorage of the root structure to the medium and also allows the substrate to hold and release its water/nutrient mixture and oxygen freely. The size of the material offers excellent plant holding capabilities without compaction during shipping. After a plant 10 has aged in the system, it is not uncommon to be able to invert the pot and remove the plant and its root ball without loss of any medium. The medium 5 has one-third the weight of soil.

The light/liquid meter 7, as described hereinafter, is designed to indicate when no liquid remains in the outer pot 9, as an indication that an aqueous nutrient solution must be added. It also indicates when liquid has risen to the top of the raised area 29, as an indication that too much liquid has been added and some should be removed. In the preferred embodiment, it also indicates when the proper amount of liquid has been added.

Liquid level indicators comprising elongate members in the form of rods of light-transmitting material have heretofore been used for the purpose of indicating the level of liquid in industrial containers. Pliml, U.S. Pat. No. 3,535,933, discusses the theory of such meters, and his disclosure is hereby incorporated by reference.

The light/liquid meter 7 includes transparent light transmitting rods 41, 43, and 45 free from any peripheral interference. These rods are positioned such as to remain physically separated although adjacently positioned. The rods are preferably made from tinted extruded polysulfone.

The upper portion of each light transmitting rod 41, 43, and 45 is mounted in a single, stepped connecting body 47. The flat upper surfaces of the light transmitting rods form indicating surfaces 49 which are flush with the steps of the connecting body 47. The rods extend below the connecting body 47 and terminate in conical tips 51. The tips 51 have an included angle of ninety degrees, so as to reflect back light to the indicating surfaces 49 when the tip is in air, but so as to refract light out of the rod when the tip is immersed in a liquid having an index of refraction more nearly that of the rod. The rods are of varying length, rod 41 being the shortest and rod 45 the longest. Rod 45 extends below the bottom of the liner 3 to the bottom of the outer pot 9. Rod 41 extends to a point slightly below the top of the raised center 29. Center rod 43 extends approximately three-quarters inch below the top of the raised center 29.

The light reflective characteristics of the light/liquid meter 7 are much improved by maintaining the rods' indicating surfaces 49 flush with the top of the connecting body 47. Further enhancement is obtained through the choice of the plastic and through carefully controlled forming methods.

The outer pot 9 is made of opaque one-eighth inch polyethylene. It has an inner diameter one-quarter inch larger than the outer diameter of the liner 3. The exterior base of the container 9 has several little feet or ribs to hold the container bottom away from the surface on which it is placed. These feet are inside the circumference one tenth of the diameter of the container. Their purpose is to prevent sweating under the container and damage to furniture.

The planter 1 is prepared for use by placing the growing medium 5 in the liner 3 and planting the plant 10 at the proper depth in accordance with known hydroculture techniques. The appropriate light/liquid meter 7 is installed in the liner 3 by sliding the light transmitting rods through holes 25 until the connecting body 47 is flush against closure wall 23. The plant pot liner 3 complete with medium 5, meter 7, and plant 10 is then placed in the outer pot 9 of the system, and the planter 1 is moved to a possible permanent location. Enough water or liquid nutrient 12 is added to cover the end of the longest rod 45. Light is refracted from the tip 51 of the rod 45, and its indicating surface 49 appears dark even in the brightest of ambient light conditions. Because the diameters of the rods 41, 43, and 45 have been predetermined for the type of plant in question, the viewer merely notes whether the rods' indicating surfaces 49 appear different, indicating proper light location for the plant, or appear the same, indicating not enough light for the plant. It is not necessarily bad for a plant to receive more light than necessary.

When a location has been picked for the planter 1, more aqueous nutrient 12 is poured into the growing medium 5 until the second rod 43 suddenly becomes dark. At that moment, sufficient nutrient has been added. If the third rod 45 becomes dark, too much nutrient has been added, and the excess must be drained, preferably by first lifting the liner 3 out of the outer container 9, using the tabs 17.

The planter 1 may then be left alone until the longest rod 45 becomes light.

The geometry of the liner 3, the slots 27, and the raised and lower areas 29 and 31, as well as the clearance between the inner pot 3 and the outer pot 9, are all chosen to provide proper watering, feeding, and aeration of the plant 10 through its roots.

The raised area 29 allows the humidity within the growing chamber to be less in the center where the root ball is most susceptible to water stress. The unraised portion 31 is where moisture is taken up through the growing medium into the growing chamber. The actual growing chamber itself starts at the top of the raised portion 29. Below this point is the water/nutrient reservoir, which functions as part of the growing chamber as the liquid level decreases to empty.

The slots 27 are for oxygen circulation through the growing medium 5. If there are too few slots 27, the plant will starve for oxygen. If there are too many, the humidity will go down below acceptable levels and the liquid consumption will increase. The aeration openings 27 must start at or below the optimum liquid level and run well above the maximum allowed level of liquid in the planter, preferably at least twice the height of the raised portion 29. In the preferred embodiment, it will be seen that the aeration slots 27 begin approximately one-half inch from the bottom of the liner and are four inches in length; thus approximately three inches of each slot 27 is not immersed in liquid when the system is initially filled.

For a particular growing medium 5, the amount of liquid drawn into the system by capillary action is controlled by the relative areas of the raised portion 29 and the lower portion 31 of the bottom wall 13. To permit more liquid to be drawn into the growing medium 5, the area of the lower portion 31 may be increased; to permit less liquid to be drawn into the growing medium 5, the area of the lower portion 31 may be decreased.

When the liquid level in the outer pot 9 falls to one-quarter inch, the growing medium 5 no longer picks up the liquid and begins to dry, through the circulation of air through the aeration slots 27, through the gap between the liner 3 and the outer pot 9, and through the growing medium itself, and through transpiration of the plant 10 growing in the medium. Nonetheless, the longest rod 45 continues to indicate the presence of liquid. Therefore, when the rod 45 finally becomes bright, and liquid is added, the growing medium 5 has been out of liquid for about a week and has dried about ten to twenty percent. This cycle greatly enhances root growth and plant health.

Numerous variations, within the scope of the appended claims, will be apparent to those skilled in the art in light of the foregoing description and accompanying drawings. Merely by way of example, the inner and outer pot combination and geometry may be utilized with other growing media and other liquid level meters, with or without a light meter. The aeration openings may be formed as a series of holes, placed more or less randomly around the wall of the liner 3. The raised part of the bottom wall of the liner 3 may be formed as multiple raised parts and positioned differently. The expanded slate growing medium may be utilized with other hydroculture systems. The light/liquid meter may be used with other hydroculture systems, or even with entirely different growing systems.

Numerous changes can be made in the light/liquid meter. For example, connecting body 26 need not be stepped. The light transmitting rods may be clear or tinted, or may have a colored or opaque coating applied thereto, for example to color code the meanings of the rods. The upper indicating surface may have a clear or colored lens affixed thereto, or a part of the upper surface may be frosted to intensify the difference between its "dark" appearance and its "light" appearance. If desired, the connector 47 may include an indicator showing the proper appearance of the indicating surfaces 49 when sufficient light is present. A fourth, short, rod may be included as a reference. Conversely, only two rods may be used if liquid is added slowly and the rods watched carefully.

If no provision has been made in the hydroculture system to accept connector body 47, it may be modified to be placed in the system in the location previously used by the prior art float type indicator, for example by providing it with a hook or slot to affix the meter 7 to the rim of the inner or outer pot of a planting system. An opaque housing may be placed around all the rods, in lieu of separate coatings on each rod, particularly if the rods are bunched, rather than being arranged in a line. Neither the coating nor the housing is necessary if care is taken to prevent light leakage into the space between the inner and outer pots.

These variations are merely illustrative.

I claim:

1. A planter comprising an outer container, a perforated liner, a growing medium in the liner, a plant in the growing medium, and a light/liquid level meter positioned between the outer container and the liner, the meter comprising a plurality of light-transmitting rods, each having an upper indicating surface and a retroreflective bottom, the dimensions and material of the rods being so chosen that in ambient lighting conditions suitable for growth of said plant the indicating surface of the rod appears dark when the bottom is immersed in the liquid and light when the bottom is out of liquid.

2. The planter of claim 1 wherein the liner includes a side wall having a recess therein for receiving the rods.

3. The planter of claim 2 wherein the liner includes a rim, an inward step in the rim over the recess, and means in the step for holding the meter, so that the rods extend between the outer container and the liner, but appear to extend into the growing medium.

4. The planter of claim 3 wherein the meter includes a connecting body for holding the rods.

5. The planter of claim 4 wherein the connecting body includes a plurality of steps for indicating which of the rods extends the deepest into the outer container.

6. The planter of claim 1, wherein a light reducing coating is applied to said rods, said coating covering only the sides of said rods and not covering their ends.

7. The planter of claim 1 wherein the liner includes a side wall and a bottom wall, the bottom wall having a raised reservoir portion, one of the rods extending substantially to the bottom of the outer container and another of the rods extending to a depth slightly below the height of the raised portion.

8. The planter of claim 7 wherein the liner includes air passages in the outer wall of the liner, the air passages being positioned from below the top of the raised portion to a height substantially above the height of the raised portion and a liquid nutrient in the outer container, the liquid nutrient having an upper surface below the level of the raised portion.

9. The planter of claim 7 wherein the meter includes three rods, a third rod extending to a depth spaced less than an inch from the height of the raised portion.

10. The planter of claim 7 wherein the growing medium is expanded slate.

11. A planter comprising an open-topped outer container, a liner in the outer container, and a growing medium in the liner, the liner including a side wall and a bottom wall, a liquid nutrient in the outer container, and liquid level meter positioned between the outer container and the liner, the meter comprising non-moving metering means indicating both when the nutrient level has reached a maximum allowable level and when the nutrient level has dropped below the bottom wall of the liner.

* * * * *